A. J. HORTON.
MOTOR CONTROLLING DEVICE.
APPLICATION FILED JUNE 1, 1909.
982,365.
Patented Jan. 24, 1911.
2 SHEETS—SHEET 1.
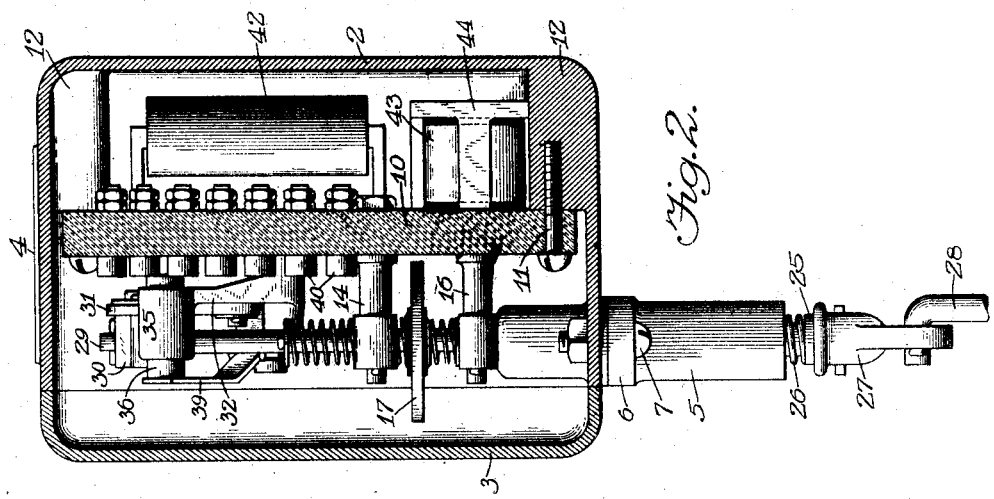
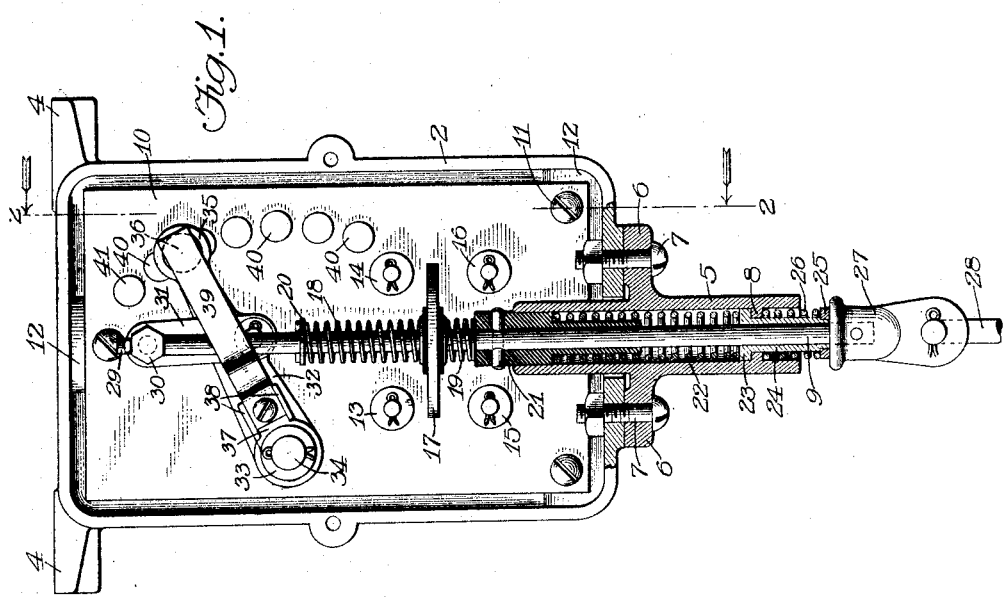
Witnesses:
George Haynes
Inventor:
Albert J. Horton.
By Edwin B. H. Tower, Jr.
Atty.

A. J. HORTON.
MOTOR CONTROLLING DEVICE.
APPLICATION FILED JUNE 1, 1909.

982,365.

Patented Jan. 24, 1911.
2 SHEETS—SHEET 2.

Witnesses:
George Haynes
W Fitzgerald

Inventor:
Albert J. Horton.
By Edwin B. H. Tower Jr.
Atty.

UNITED STATES PATENT OFFICE.

ALBERT J. HORTON, OF WHITE PLAINS, NEW YORK, ASSIGNOR TO THE CUTLER-HAMMER MFG. CO., OF MILWAUKEE, WISCONSIN, A CORPORATION OF WISCONSIN.

MOTOR-CONTROLLING DEVICE.

982,365.  Specification of Letters Patent.  Patented Jan. 24, 1911.

Application filed June 1, 1909. Serial No. 499,564.

*To all whom it may concern:*

Be it known that I, ALBERT J. HORTON, a citizen of the United States, residing at White Plains, in the county of Westchester and State of New York, have invented new and useful Improvements in Motor-Controlling Devices, of which the following is a full, clear, concise, and exact description, reference being had to the accompanying drawing, forming a part of this specification.

My invention relates to improvements in motor controlling devices.

One object of my invention is to provide a compact, efficient and durable device for controlling the starting, stopping and speed of an electric motor.

A further object is to provide a controller which is particularly adapted to be operated by a treadle, such as the operating treadle of a sewing machine.

Other objects and advantages of my invention will be hereinafter made clearly apparent.

For the purpose of illustrating my invention, I have shown one embodiment thereof in the accompanying drawings.

Figure 3:
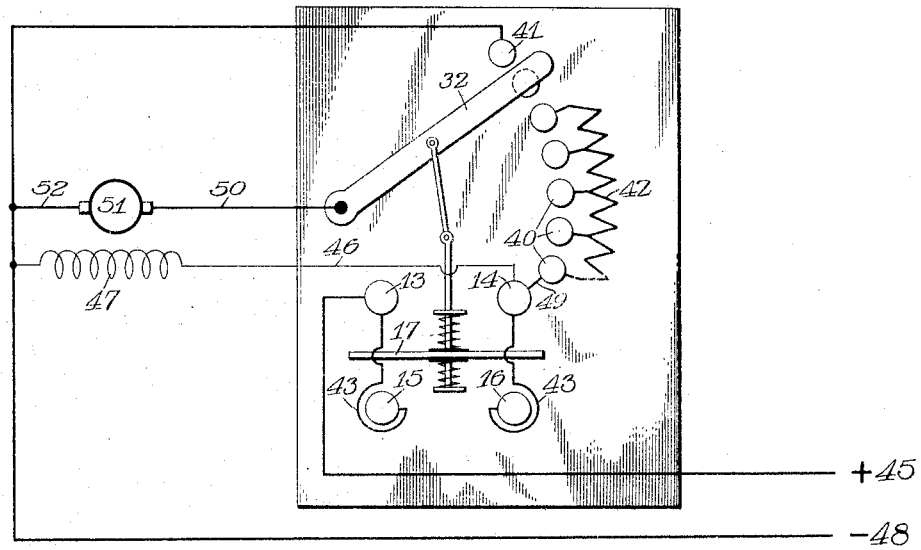
Figure 4:
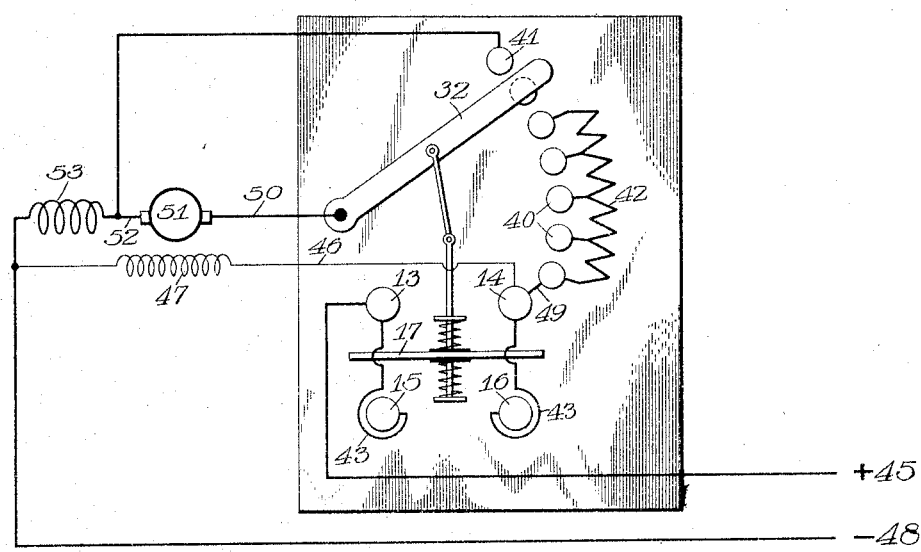

In said drawings, Figure 1 is a plan view of my device with the cover removed, a portion thereof being shown in section. Fig. 2 is a sectional view taken through the complete device as seen on the line 2—2, Fig. 1. Figs. 3 and 4 are diagrammatic views showing the circuit arrangement of the device as used with a shunt and compound wound motor respectively.

In the preferred embodiment of my invention, I provide a suitable casing 2, which may be formed of iron or other desired indestructible material for inclosing the various parts of the controller, provided with a removable cover 3 to permit access to the interior thereof. Suitable securing lugs 4 are provided at the top of the casing by which the same may be secured in desired operative position. The lower end of the casing is provided with an opening through which extends a hollow cylindrical member 5, which is secured in place in any desired manner. In the drawing, I have shown the member 5 provided with laterally extending ears 6 and bolts 7 take through said ears and through the adjacent portions of the casing. The member 5 is of the same diameter throughout its length, with the exception of an internal bead 8 for a purpose hereinafter set forth. A rod 9, by means of which the controller is adapted to be operated, extends through the member 5.

Mounted within the casing 2 is a suitable panel or base 10 which may be formed of any desired insulating material, such as slate, soap-stone, marble, etc., and upon which the various parts of the controller are mounted. This base or panel 10 is permanently secured in place by means of bolts or screws 11, which take into enlarged portions 12 formed integral with the casing. Of course, it will be understood that the base may be secured in place in many other ways. The front face of the base or panel has mounted thereon two pairs of stationary contact posts 13—14 and 15—16 respectively. Said posts are preferably formed with reduced end portions to receive renewable contact rollers which are secured thereon in any desired manner. The pairs of contact posts are arranged to be bridged by a switch member, preferably in the form of a disk 17, which is normally disposed intermediate of said pairs of contact posts. The disk 17 and the stationary contact posts 15 and 16 are preferably formed of magnetic material for a purpose hereinafter fully set forth.

The contact disk 17 is loosely mounted upon and insulated from the rod 9 and is resiliently supported thereon by means of springs 18 and 19. The spring 18 is interposed between said disk and a collar or washer 20 secured to the rod, while the spring 19 is interposed between the disk and a sleeve 21, pinned or otherwise secured in place on the rod 9. The sleeve 21 extends into the opening in the member 5 and a heavy return spring 22 is disposed in said opening around the rod 9 and between said sleeve and a flange 23 formed on one end of a sleeve 24, which is loosely disposed on the rod 9. Said sleeve 24 is limited in its downward movement by the flange 23, which engages the internal bead 8 formed in said member 5. The lower end of the sleeve 24 preferably has a removable collar 25 thereon for facilitating the assembling of the parts. A spring 26 is disposed around the sleeve 24 and is interposed between the collar 25 and the bead 8. The lower end of the rod has a head 27 removably secured thereto, to which an operating rod 28 is secured.

Said rod 28 may be secured to a treadle or other suitable operating member whereby the operation of the device may be controlled.

The upper end of the rod 9 preferably has a reduced portion 29 which extends through a stud member 30, pivoted to an insulating link 31, the other end of said insulating link being pivotally secured to an arm 32. It will be understood that the rod 9 may be secured to the insulating link in various other ways. The arm 32 has a hub portion 33 which is pivoted on a stud 34 secured to the base 10. The other end of the arm 32 is provided with a hollow guide 35 adapted to receive a contact 36. The hub 33 has an extended portion 37 which is provided, upon its upper face, with beads 38 to form a guideway for a spring member 39. Said spring member has one end secured to the extended portion 37 by means of a screw, or otherwise, while its opposite end bears against the contact 36. It will, of course, be understood that the arm may be provided with any other suitable form of contact. A series of contact buttons 40 and a single contact 41 are mounted upon the base 10 and are arranged to be engaged by the movable contact 36. The series of contacts 40, except the first, are preferably connected at intervals to a resistance 42 secured upon the rear of the base.

The posts 15 and 16 are preferably extended through the insulating base 10 to provide cores for windings 43. Each of said windings is also provided with a frame 44 of magnetic material connected to one end of the core thereof. The windings, when energized, set up a magnetic field including the posts 15 and 16 for the purpose hereinafter clearly set forth. In the drawings, the parts of the controller are shown in initial position, being always returned thereto by the springs 22 and 26 when the rod is released.

When the treadle is properly operated, the rod 9 is moved downwardly and the arm 32 will be moved so that the contact 36 engages the second of the series of contact buttons 40 and the disk 17 will bridge the contact posts 15 and 16. Further operation of the treadle will cause the rod 9 to move downwardly through the disk 17 which compresses its positioning spring 18, and the arm is moved over the succeeding contact buttons 40. Upon the release of the rod, the return spring 22, which has been tensioned, will move the rod upwardly. The spring 18 will hold the disk 17 against the posts 15 and 16 until the arm 32 moves back to the first of the buttons 40, and said disk 17 is then disengaged from said posts as hereinafter clearly set forth.

An upward movement of the rod from initial position will move the disk 17 into engagement with the contact posts 13 and 14, and also move the arm into engagement with contact 41. When the rod is released, return spring 26, which has been compressed between the flange 25 and the bead 8, will move the rod to initial position, thus bringing all parts of the controller into initial position.

In Figs. 3 and 4 I have shown diagrammatically the preferred circuit arrangements of my device when used to operate a plain shunt and a compound wound motor respectively. In said figures, as will be seen, the coil 43 around post 15 has one terminal connected to said post and the other to post 13, and that the coil around post 16 is similarly connected. Referring to the diagrammatic views, when the rod is operated to start the motor, circuit is closed as follows: from the positive side 45 of the source of supply to the contact post 13, to and through the coil 43 around post 15 to said post, across disk 17 to post 16, through coil 43 to post 14 where the current divides, part going by conductor 46 to the shunt field 47 and to the negative side 48 of the source of supply, and the other portion of the current by conductor 49 to the last of the series of buttons 40, through all of the resistance 42 to arm 32, conductor 50, armature 51 and by conductor 52 to the negative side 48 to the source of supply. The motor will thus be started with all the armature resistance in circuit. A continued movement of the rod 9 will cause the arm 32 to move over the remaining contacts 40 to remove the resistance sections from circuit to increase the motor speed as desired. When it is desired to stop the motor, the rod is allowed to be moved upwardly by the return spring 22. It will be understood, however, that since the coils 43 are included in the motor circuit, said coils will magnetize the posts 15 and 16, and said posts will hold the disk 17 thereagainst until the spring 19 is tensioned by the sleeve 21 and the tension of the spring 22 overcomes the pull of the magnets, when the disk will be forced away from said posts and quickly returned to initial position by said spring 19. By the construction just described, the disk is caused to leave the contact posts with a "snap," thus eliminating all danger of arcing. To bring the motor to a quick stop, the treadle is operated to force the rod 9 upwardly to cause the contact arm 32 to engage the disk 41 and the contact disk 17 to engage the posts 13 and 14. This results in closing the circuit of the shunt field from the positive side of the line to post 13, across disk 17 to post 14, by conductor 46 to the shunt field and to the negative side of the source of supply as previously described, and also in closing a circuit across the armature terminals as will be clearly seen in the drawings. This causes the motor to act as a dynamic brake to quickly stop the device operated thereby, as will be understood by those skilled in the art. The circuit connections, as previously described, are the same in Figs. 3 and 4 with the exception that in Fig. 4 I have shown a series field 53 which is preferably connected between conductors 52 and 48 so that the series field will be excluded when the armature is connected in the dynamic braking circuit.

By the construction herein described, it will be seen that I secure a controller by which a motor may be controlled through a wide range of speed. It will also be seen that, when the controller is in initial position, the motor is disconnected from circuit, thus preventing waste of current. It will further be seen that the motor may be operated intermittently without destructive effects to the controller, due to continued arcing at the switch contacts.

While I have described the device as controlling sections of armature resistance to vary the speed of the motor, it will be understood that various other circuit connections may be made to be controlled by the device whereby the motor speed may be varied.

I claim—

1. In a motor controlling device, in combination, a pivoted resistance controlling arm movable in a vertical plane, a vertically movable switch member having coöperating stationary contacts forming stops therefor, and a common operating member for said arm and said switch member, said operating member being resiliently connected to said switch member, to allow continuous movement of said arm thereby, after said switch member is moved into engagement with its stationary contacts.

2. In a motor controlling device, in combination, a pivoted resistance controlling element, a longitudinally movable operating member therefor, and a switch member resiliently mounted upon said operating member, said operating member being adapted to cause continued movement of said element after said switch member has engaged its coöperating contacts.

3. In a motor controlling device, in combination, a pivoted resistance controlling element movable in a vertical plane, a vertically movable operating member, an insulating link connecting said operating member to said element, a contact disk resiliently mounted upon said operating member and stationary contacts arranged to be engaged by said disk, said operating member being adapted to continue the movement of said element after said disk has been moved into engagement with its coöperating contacts.

4. In a motor controlling device, in combination, an insulating base, a series of contact buttons arranged substantially vertically thereon, a contact member pivoted upon said base and movable over said series of contacts, a pair of contact studs arranged horizontally on said base, a vertically movable operating rod connected to said contact member, and a switch member resiliently mounted upon said operating rod for engaging said contact posts, said operating rod being adapted to continue the movement of said pivoted contact member after said switch member has been moved into engagement with said contact posts.

5. In a motor controlling device, in combination, a supporting base, a series of contacts mounted thereon, a contact member pivoted to said base and arranged to sweep over said series of contacts, an operating member for said pivoted member, two pairs of contact studs secured to said base, a switch member resiliently mounted upon said operating member and adapted to bridge either of said pairs of contact studs, and opposing means for biasing said operating member to a position in which said switch member is out of engagement with both pairs of contact studs.

6. In a motor controlling device, in combination, an insulating base, a series of contacts arranged substantially vertically thereon, a contact member pivoted to said base and arranged to sweep over said series of contacts, a vertically movable rod connected to said pivoted member to operate the same, a switch member loosely mounted upon said rod, opposing springs pressing against said switch member, two pairs of horizontally arranged contact studs adapted to be engaged by said switch member when moved in opposite directions, said springs permitting continued movement of said operating rod after said switch member has engaged its coöperating contacts, and opposing means biasing said rod to a position in which said switch member is out of engagement with both pairs of contact studs.

7. In a motor controlling device, in combination, an operating member movable in opposite directions from initial position, means actuated thereby to close the motor circuit, and additional means actuated thereby subsequent to the closure of the motor circuit to vary the speed of the motor when said member is moved in one direction, said means being adapted to close a dynamic braking circuit when the member is moved in the opposite direction.

8. In a motor controlling device, in combination, a base, an operating member movable longitudinally thereof in opposite directions from initial position, a contact arm pivoted to said base movable by said operating member, a series of contacts arranged to be engaged by said contact arm to vary the motor speed when the operating member is moved in one direction, and a contact adapted to be engaged by said contact arm to close a dynamic braking circuit when said operating member is moved in the opposite direction.

9. In a motor controlling device, in combination, a switch member having two operative positions adapted, when in one position, to close the motor circuit, and, when in its other operative position, to close the circuit of the motor field, a pivoted arm movable in opposite directions adapted, when moved in one direction, to control the speed of the motor, and, when moved in the opposite direction, to close a dynamic braking circuit, and an operating member movable in opposite directions adapted, when moved in one direction, to cause the switch to close the motor circuit and the arm to control the speed of the motor, and, when moved in the opposite direction, to cause said switch to close the field of the motor and the arm to close the dynamic braking circuit.

10. In a motor controlling device, in combination, a longitudinally movable member, a switch contact resiliently supported thereon, a pair of stationary contacts adapted to be engaged by said switch contact to close the motor circuit when said member is moved, and an arm pivoted to said member and movable thereby for controlling the speed of the motor subsequent to the closure of the motor circuit.

11. In a motor controlling device, in combination, with an insulating base and an operating member mounted thereon and movable in opposite directions; of a switch member supported on said movable member, a pair of switch contacts adapted to be engaged by said switch member to close the motor circuit, a series of contacts arranged on the base, and an arm pivoted on the base and connected to said operating member to be moved over said series of contacts, when said operating member is moved in one direction, and a pair of contacts adapted to be engaged by said switch member to close the circuit of the shunt field of the motor, and a contact adapted to be engaged by said arm to close a dynamic braking circuit, when said operating member is moved in the opposite direction.

12. In a motor controlling device, in combination, a member movable in opposite directions, a switch member loosely disposed thereon, resilient means for normally holding said switch in one position, two pairs of stationary contacts, said switch member, when the movable member is moved in one direction, being adapted to engage one pair of said contacts to complete the motor circuit, and, when said member is moved in the opposite directions, to engage the other pair of contacts to complete the circuit of the motor field, and a pivoted resistance arm adapted to vary the speed of the motor after the motor circuit has been closed, and to close a circuit across the terminals of the motor armature when the motor field is closed.

13. In a motor controlling device, in combination, a member movable in opposite directions, a switch member loosely disposed thereon, resilient means for normally holding said switch in one position two pairs of stationary contacts, said switch member, when the movable member is moved in one direction, being adapted to engage one pair of said contacts to complete the motor circuit, and, when said member is moved in the opposite direction, to engage the other pair of contacts to complete the circuit of the motor field, a pivoted resistance arm, a series of contacts adapted to be engaged thereby after the motor circuit has been closed to vary the motor speed, and a single contact adapted to be engaged thereby when the motor field is closed to complete a circuit across the terminals of the motor armature.

14. In a motor controlling device, in combination, a member movable in opposite directions, a switch member loosely disposed thereon, resilient means for normally holding said switch in one position, two pairs of stationary contacts, said switch member, when the movable member is moved in one direction, being adapted to engage one pair of said contacts to complete the motor circuit, and, when said member is moved in the opposite direction, to engage the other pair of contacts to complete the circuit of the motor field, a pivoted resistance arm, a series of contacts adapted to be engaged thereby after the motor circuit has been closed to vary the motor speed, a single contact adapted to be engaged thereby when the motor field is closed to complete a circuit across the terminals of the motor armature, and means tending to return said movable member to initial position when moved in either direction.

15. In a motor controlling device, in combination, a plurality of switches, an actuating member therefor movable in opposite directions, said switches tending to stand in a position to disconnect the motor armature and shunt field winding from circuit, said switches being movable in one direction to close the motor circuit and to thereafter accelerate the motor, said switches being movable in an opposite direction from initial position to connect the shunt field of the motor to the source of supply and to close a dynamic braking circuit across the terminals of the motor arm.

16. In a motor controlling device, in combination, an operating member movable in opposite directions from initial position, a plurality of switches controlled thereby and standing in position to disconnect the motor from circuit when the operating member is in initial position, said switches being movable in one direction from initial position to close the motor circuit and to thereafter vary the motor speed, said switches being movable in the opposite direction from initial position to close the circuit of the shunt field of the motor and to close a dynamic braking circuit across the terminals of the motor armature, and means tending to return the operating member to initial position when moved in either direction.

17. In a motor controlling device, in combination, an operating member, a switch adapted to be closed by said member, a pivoted contact arm also controlled by said operating member, a spring adapted to be placed under tension to open said switch, and electromagnetic means for retaining said switch closed until said spring is placed under tension.

18. In a motor controlling device, in combination, an operating member, a switch for closing the motor circuit adapted to be actuated by said member, a pivoted contact arm for controlling the speed of the motor after said switch has been actuated, a spring adapted, when placed under tension, to open said switch, and electromagnetic means for retaining said switch closed until said spring is placed under tension.

19. In a motor controlling device, in combination, with a switch and spring adapted, when placed under tension, to open said switch, and electroresponsive means for holding said switch closed until said spring is placed under tension; of an operating member for said switch, a pivoted resistance controlling arm, and means connecting said switch, arm and operating member, insuring the closure of said switch, and the subsequent operation of said arm when the operating member is moved in one direction.

20. In a motor controlling device, in combination, an operating member, movable in opposite directions from normal position, a switch, a speed controlling member, said operating member adapted, when moved in one direction, to cause said switch to close the motor circuit and the speed controlling member to subsequently vary the motor speed, and, when moved in the opposite direction, to cause said switch and speed controlling member to close a dynamic braking circuit.

In witness whereof, I have hereunto subscribed my name in the presence of two witnesses.

ALBERT J. HORTON.

Witnesses:
W. L. CULLY,
CHARLES B. BAKER.